Figure 1:
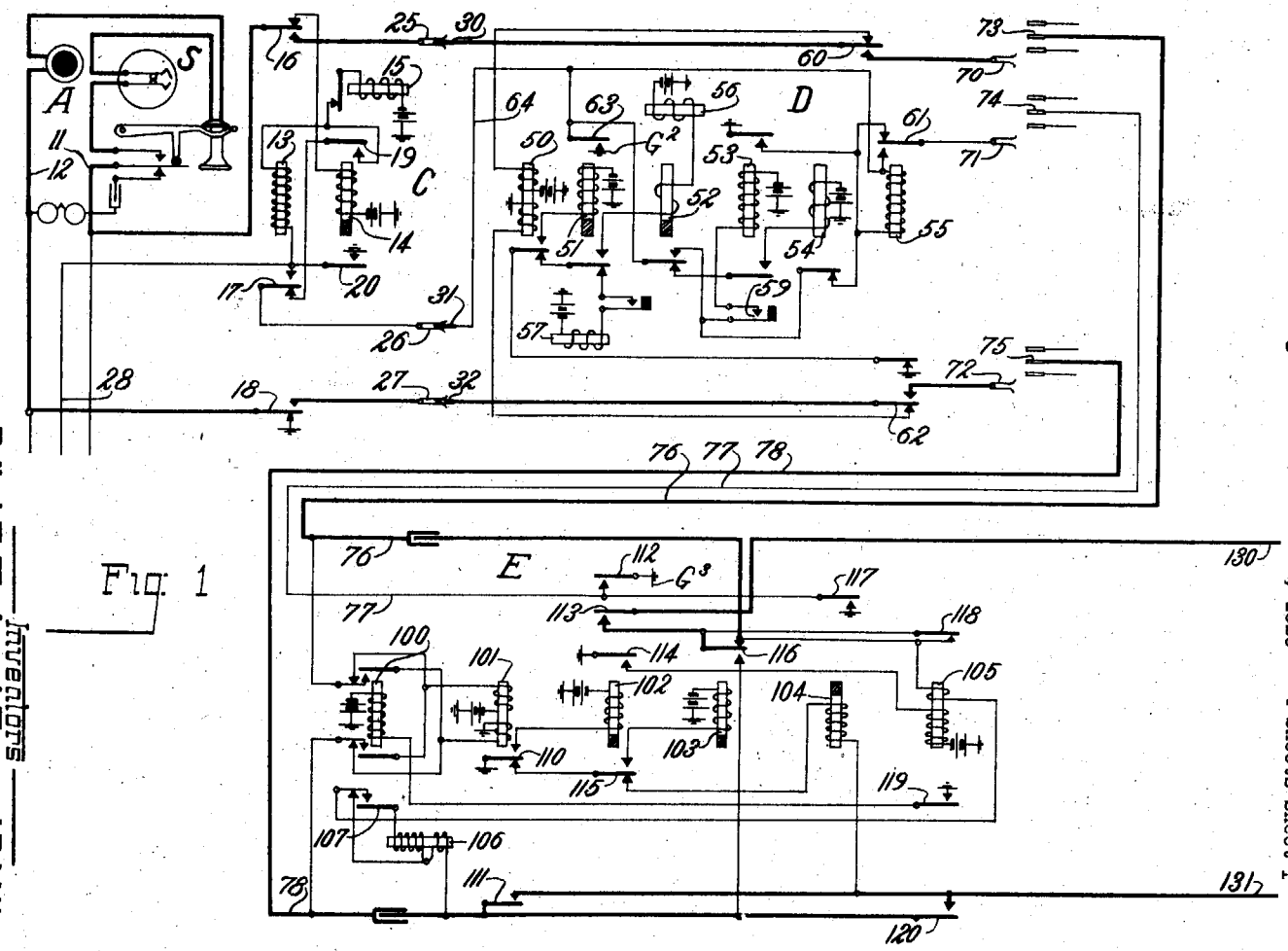

Dec. 28, 1926. Re. 16,514

T. G. MARTIN ET AL

MULTIOFFICE TELEPHONE SYSTEM

Original Filed March 22, 1920 4 Sheets-Sheet 1

Inventors
Talbot G. Martin and Bernard D. Willis

R. B. Richardson Atty.

Dec. 28, 1926. Re. 16,514

T. G. MARTIN ET AL

MULTIOFFICE TELEPHONE SYSTEM

Original Filed March 22, 1920 4 Sheets-Sheet 2

Inventors
Talbot G. Martin and Bernard D. Willis
R. B. Richardson Atty

Dec. 28, 1926. Re. 16,514

T. G. MARTIN ET AL

MULTIOFFICE TELEPHONE SYSTEM

Original Filed March 22, 1920 4 Sheets-Sheet 3

Inventors
Talbot G. Martin and Bernard D. Wilhs
R. S. Richardson Atty.

Dec. 28, 1926. Re. 16,514

T. G. MARTIN ET AL

MULTIOFFICE TELEPHONE SYSTEM

Original Filed March 22, 1920 4 Sheets-Sheet 4

Inventors
Talbot L. Martin and Bernard D. Willis
R. G. Richardson Atty.

Reissued Dec. 28, 1926.

Re. 16,514

UNITED STATES PATENT OFFICE.

TALBOT G. MARTIN, OF CHICAGO, AND BERNARD D. WILLIS, OF OAK PARK, ILLINOIS, ASSIGNORS, BY MESNE ASSIGNMENTS, TO AUTOMATIC ELECTRIC INC., OF CHICAGO, ILLINOIS, A CORPORATION OF DELAWARE.

MULTIOFFICE TELEPHONE SYSTEM.

Original No. 1,475,590, dated November 27, 1923, Serial No. 367,850, filed March 22, 1920. Application for reissue filed November 27, 1925. Serial No. 71,780.

Our invention relates in general to multi-office telephone systems but more particularly to such systems as comprise in one network offices or exchanges of two different kinds, the offices of one kind being manual offices wherein connections are completed by operators, while the other kind of offices are automatic offices in which connections are completed by means of automatic switches; and the object of the invention is to provide new and improved circuit arrangements for handling inter-office calls between the automatic and manual exchanges.

Systems having both kinds of exchanges as above pointed out are becoming quite common and may arise either by consolidation of existing manual and automatic systems serving the same territory, or by the process of changing over a manual system to an automatic system. Usually in the latter case only one office at a time is converted from manual to automatic and it follows that during the period of transition there will necessarily be both kinds of offices in operation. However this situation may arise, it is necessary to provide suitable circuit arrangements for handling calls from the manual offices to the automatic offices, and from the automatic offices to the manual offices. Our invention is concerned only with the latter class of calls, and provides in general a trunking system comprising automatic to manual trunks which are accessible to selector switches in the automatic office and terminate in plugs in front of a B operator at the manual office, together with call registers for registering the digits in telephone numbers called by automatic subscribers when the trunks are taken for use, and an indicating device upon which such numbers are shown to the operator one after the other as fast as she can complete the desired connections.

A special object is to provide circuits such that automatic subscribers are not required to talk to an operator when engaged in establishing a connection to a manual subscriber, and are not required to perform any other acts which might indicate that the system is not full automatic. The telephone numbers may all be of the same character and the operations so far as the calling automatic subscriber is concerned, and so far as he is aware of, are identically the same whether he calls a party in an automatic exchange or in a manual exchange. By thus providing for uniform methods of calling by the automatic subscribers the probability of error and confusion in automatic to manual calls due to the two different types of exchanges is entirely eliminated. Other advantages, not now specifically mentioned, will be pointed out during the explanation of the operation of the system which is included in the detailed specification which is to follow, reference being had to the accompanying drawings forming a part thereof.

Figure 2:
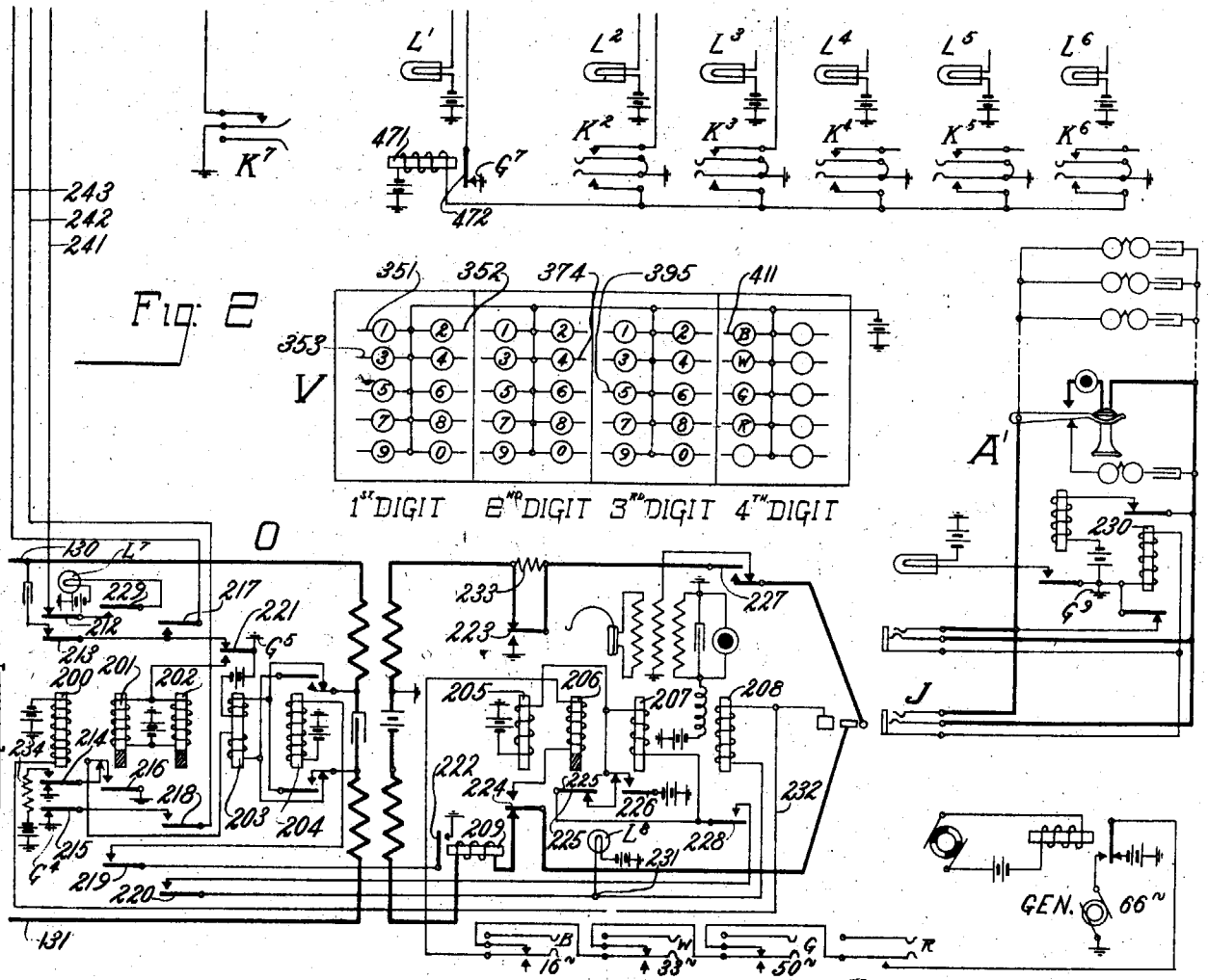
Figure 3:
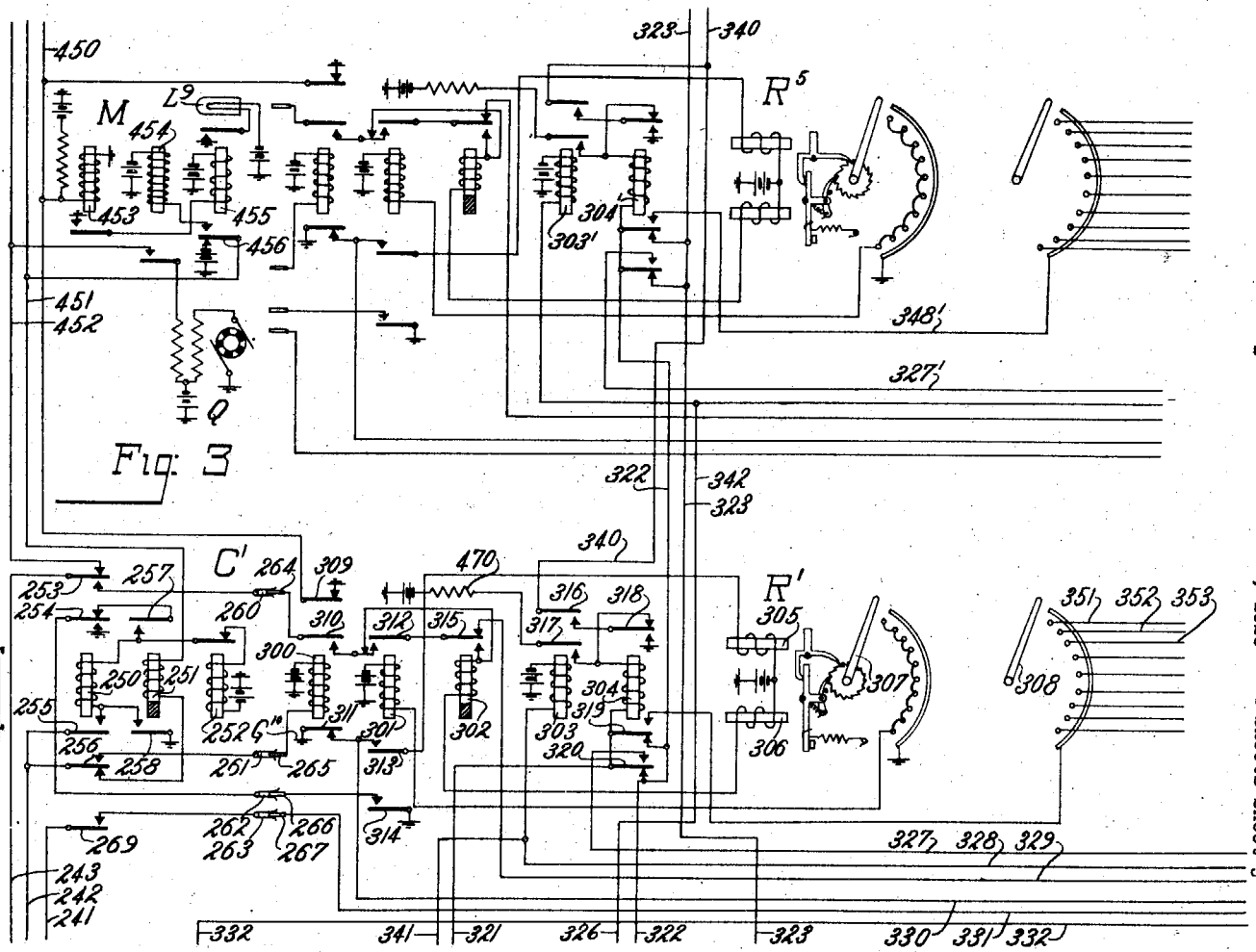
Figure 4:
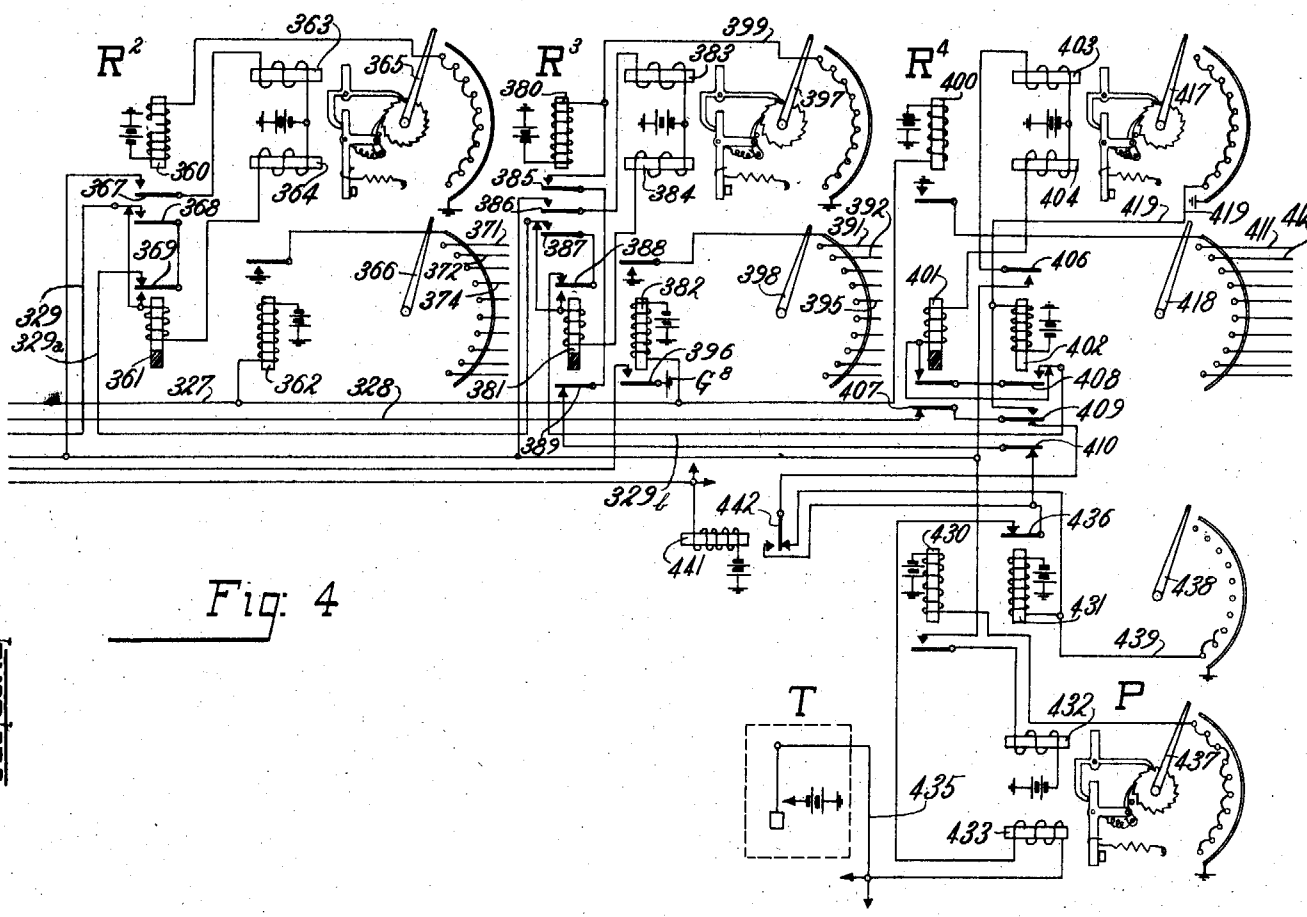

In the drawings, comprising Figs. 1, 2, 3, and 4, we have shown by means of the usual circuit diagrams the apparatus and circuit connections thereof which is involved in a complete connection extending from the automatic substation A, Fig. 1, to a manual substation A′, Fig. 2. The apparatus indicated in Fig. 1 is located in an automatic exchange, while the apparatus indicated in Figs. 2, 3, and 4 is located in a manual exchange. Inasmuch as the automatic switching equipment itself and the manual equipment are both well known and of the usual type, no detailed description of the mechanical features of this apparatus will be given, except in so far as it is found convenient or necessary to do so in the explanation of the operation of the circuits.

Referring to Fig. 1, the substation A is one of a plurality of ordinary automatic substations terminating in the automatic exchange previously referred to, and is provided with the usual talking equipment and ringer, and also with a calling device of well known type which is indicated by the reference character S, through the medium of which the subscriber controls the central office switches.

The line conductors 11 and 12 extend to the exchange where they terminate in the line switch C, which may be briefly described as a rotary line switch whose movable terminals or wipers have no normal position, and which have movement in a forward direction only. The construction of a line switch of this type is well known in the art, and its function, also well understood, is to extend its associated line when calling to an idle trunk line. In carrying out this object, a plurality of these individual line switches are given access to a group of trunk lines extending to first selector switches. One of the trunk lines to which the line switch C has access is shown in the drawing as extending to the first selector D, which is a vertical and rotary selector of the well known Strowger type. In a multi-office system of the kind herein contemplated the first selector switches are usually known as office selectors and the selector D in common with a plurality of similar selectors has access to a plurality of groups of trunk lines, each of which groups may extend to a different office or exchange in the system. Some of these groups of trunk lines may extend to automatic exchanges, while other groups may extend to manual exchanges. A trunk line in one of the latter groups is shown in the drawing, and extends by way of the repeater E and trunk line conductors 130 and 131 to the plug ending cord circuit O, Fig. 2. The repeater E is an automatic impulse repeater of the general type in common use, and in addition has provisions for repeating operating impulses to the distant manual exchange, provides holding circuits for the automatic switches in the automatic exchange, and thus renders it unnecessary to use more than two conductors for the inter office trunk line. The cord circuit O is one of a plurality of similar cord circuits at a B operator's position in the manual exchange and constitutes the means whereby the trunk line shown may be connected by the operator with any one of the manual lines terminating in the manual exchange. One of these lines is the line of substation A′, which terminates in the jack J, shown at the right of Fig. 2.

From the foregoing it will be understood that the operation of an office selector, such as the selector D, in response to the calling of the first digit in the telephone number of a line in the manual exchange, will result in extending the connection from the line of the calling automatic subscriber to an idle plug ending cord circuit in the manual exchange. In order to take care of the remaining digits in the numbers there is provided for each B operator's position a plurality of register sets, each set being capable of registering all the digits in a telephone number, with the exception, of course, of the first digit which controls the office selector shown in the automatic exchange. In Figs. 3 and 4 we have shown one of these register sets complete. It comprises register switch $R^1$, Fig. 3, and register switches $R^2$, $R^3$, and $R^4$, Fig. 4. The register switch $R^1$ is a simple 10 point rotary switch, having the operating magnet 306 and the release magnet 305. Wipers 307 and 308 have a step by step movement over their associated banks of contacts under control of the operating magnet 306, and are restored to normal position by the release magnet 305. Register switch $R^1$ responds to the second digit of the called number and after it has operated transfers certain control circuits to register switch $R^2$, which is thus prepared for operation in response to the third digit. Register switches $R^2$, $R^3$, and $R^4$ are similar in construction to the register switch $R^1$, and are actuated in response to the calling of the third, fourth, and fifth digits in a called number, respectively.

It will be understood that the number of register switches in the register sets may be changed at will to provide for any desired numbering system. As shown herein the registers $R^1$, $R^2$, and $R^3$, are intended to be controlled responsive to digits which correspond to the line designation of the called station, while the register $R^4$ is operated only in case the called station is a party line station. As shown, therefore, provision is made for registering three regular digits and an additional party line or selective ringing digit. In case the numbers to be registered contain four regular digits an additional register switch similar to register switch $R^2$ may be inserted between register switches $R^2$ and $R^3$. The function of the registers will be pointed out more fully in the detailed explanation, when it will be understood fully how the scheme may be changed to provide for any desired numbering scheme.

As before stated there is provided a plurality of register sets for each B operator's position, and in order to show the relation between the register sets we have shown in Fig. 3, the first register switch of the second register set. This register switch is indicated by reference character $R^5$, and is exactly like the register switch $R^1$. The connections between the different register sets are made at the first register switches in each set, as shown in Fig. 3, and will be explained fully later on.

Each register set is also provided with a time controlled switch which in the case of the register set shown in Figs. 3 and 4 is indicated by the reference character P, Fig. 4. The switch P is similar in construction to the register switches but is operated by the timing mechanism instead of by means of impulses corresponding to digits in the called telephone numbers. The timing mechanism, which may be common to the exchange, is indicated by the reference character T, and may consist of any suitable kind of clockwork controlled mechanism which is adapted to produce impulses at the rate of two per second.

In order to properly extend calls which are received at the manual exchange to the register sets each cord circuit is provided with an individual rotary line switch, and these line switches have common access to all the register sets. The reference character C′, Fig. 3, indicates a rotary line switch which is individual to the cord circuit O, Fig. 2, and which has access to the first and second register sets shown, and also to the other register sets which are provided at the B operator's position in which the cord circuit O terminates. Line switch C′ is of the same construction as the line switch C, Fig. 1, although the circuits are modified somewhat in order to take care of the somewhat different requirements.

The indicating device by means of which called telephone numbers are shown to the B operator is shown in Fig. 2, where it is indicated by the reference character V. It comprises essentially a plurality of banks of switchboard lamps, there being one bank of lamps for each register switch in a register set. It will be readily understood that the lamps have the function of illuminating the digits in the called numbers and causing them to stand out so as to be readily distinguished. The digits are preferably marked in black on the reverse side of a white semi-transparent surface, and ordinarily are not very conspicuous. But when the switchboard lamp immediately behind any character or figure is lighted, such character or figure will stand out very clearly, and is read with great facility. In view of the fact that the connections are extremely simple they have not actually been drawn out, but will be briefly explained as follows: The conductors 351 and 352, etc., which terminate in the ten bank contacts associated with the wiper 308 of the first register switch, are connected, respectively, to the lamps 1, 2, etc., of the first digit group of lamps. The conductors 371, 372, etc., which come from the ten bank contacts associated with wiper 366 of the register switch $R^2$ are connected, respectively, with lamps 1, 2, etc., of the second digit lamp group. In a similar manner the conductors coming from the banks of the register switches $R^3$ and $R^4$ are connected to the lamps of the third and fourth digit groups. It should be stated furthermore that each group of lamps is not only connected to bank contacts in a certain register switch of the first set, but is multipled to corresponding register switches in all the other register sets at the position.

Having described in a general way the laycut of the system herein disclosed, the operation of the circuits will now be described more in detail, it being assumed for this purpose that the subscriber at substation A, Fig. 1, desires to obtain a connection with the manual subscriber at substation A′, Fig. 2. It will be convenient to assume in the first instance that the station A′ is a party line station, having the telephone number 23451, as this will afford an opportunity for explaining the operation of the party line register switch $R^4$. Afterward certain modifications having to do with the calling of other numbers will be considered also. When the receiver is removed at substation A, a circuit is completed over the line conductors 11 and 12 for the line relay 14 of the individual line switch C. Upon energizing, the line relay completes at its armature 20 a circuit which extends through the switching relay 13 and the stepping magnet 15 in series to battery, and at its armature 19 connects the test wiper 26 to the above circuit at a point midway between the switching relay and the said stepping magnet. The operation now depends upon whether the first selector trunk with which the wipers of the line switch are in connection is busy or is not busy. If this trunk line is busy the test contact 31 associated therewith will have a ground potential upon it, the switching relay 13 will be short circuited, and the stepping magnet 15, which interrupts its own circuit, will operate as a buzzer to advance the switch wipers 25–27, inclusive step by step in search of an idle trunk line. This operation will continue as long as the test wiper 26 continues to engage grounded or busy test contacts. However, we may assume that in the present case when the call is initiated the selector E is idle, and the test contact 31 therefore is not grounded. Under these circumstances, when the line relay 14 is energized the switching relay 13 is energized immediately afterwards, with the result that the line conductors 11 and 12 are disconnected from the winding of the line relay 14 and from ground, respectively, and are extended by way of armatures 16 and 18 and their working contacts, wipers 25 and 27, bank contacts 30 and 32 and armatures 60 and 62 and their resting contacts, to the upper and lower windings of the line relay 50 of the selector D.

As soon as the line is extended to the selector D as above described, the line relay 50 will be energized and will close the circuit of the slow acting release relay 51. Upon energizing, the latter relay prepares the circuits of the selector for operation in its vertical movement in the usual manner, and also completes a holding circuit extending back to the line switch C as follows: ground at $G^2$, working contact of armature 63 and the said armature, conductor 64, bank contact 31, test wiper 26, armature 17 and its working contact, winding of the switching relay 13, and the winding of the stepping magnet 15 to battery. It is understood that the above holding circuit is completed before the slow acting relay 14 has had time to de-energize. In addition to maintaining the switching relay energized, the holding circuit also serves to provide ground to the multiples of test contact 31 and also to the multiple test contacts in which the private normal conductor 28 terminates in the banks of the connectors which have access to the line of substation A, thereby guarding the connection against intrusion in the customary manner.

The calling subscriber may now operate his calling device S in accordance with the first digit of the desired number. Two interruptions are thereby produced in the circuit of the line relay 50, and the said line relay is accordingly twice deenergized momentarily, transmitting at each deenergization an impulse of current through the slow acting series relay 52 and the vertical magnet 56 to battery. By the operation of the vertical magnet the selector shaft is raised two steps, whereupon the wipers 70–72, inclusive, will be standing opposite the level of bank contacts in which are terminated the trunk lines extending to the manual exchange. The slow acting relay 52 is energized in series with the vertical magnet, retaining its armature attracted throughout the vertical movement of the switch, and upon the closure of the vertical off normal springs 59 completes a circuit for the stepping relay 53. Upon energizing, relay 53 prepares a circuit for the rotary magnet 54 at its lower armature, and at its upper armature establishes a locking circuit for itself. At the end of the vertical movement of the switch the slow acting relay 52 is deenergized and closes the circuit of the rotary magnet, which is thereupon energized to advance the wipers 70–72, inclusive, into engagement with the first set of bank contacts in the level opposite which they were raised. The rotary magnet 54 also breaks the locking circuit of the stepping relay 53 which accordingly is deenergized and breaks the circuit of the rotary magnet, which thereupon deenergizes also and again closes its interrupter contact. The operation now depends upon whether the trunk line with which the wipers have connected is busy or is not busy. If this trunk line is busy the test contact associated therewith will be grounded and the stepping relay 53 will be energized over a circuit which extends by way of the test wiper 71, armature 61 and its resting contact, interrupter contact of the rotary magnet, off normal springs 59, and the winding of the stepping relay 53 to battery. The stepping relay will therefore again close the circuit of the rotary magnet 54 which will operate to rotate the switch wipers into engagement with the next set of bank contacts. This operation in which the stepping relay and the rotary magnet are alternately energized and deenergized will continue as long as the test wiper 71 continues to engage grounded or busy test contacts. In the present case it will be assumed that the trunk line shown in the drawings is the first idle trunk line, and when therefore the test wiper 71 arrives at test contact 74 and the rotary magnet is deenergized, the stepping relay 53 will not again be operated, but instead the switching relay 55, which heretofore has been short-circuited, will be energized by current flowing over the following path: grounded conductor 64, winding of the switching relay 55, interrupter contact of the rotary magnet 54, off normal springs 59, and the winding of the stepping relay 53 to battery. Owing to the high resistance of the switching relay 55, stepping relay 53 is not operated. Upon energizing, relay 55 disconnects the incoming line conductors from the windings of the line relay 50 and extends them by way of armatures 60 and 62 and their working contacts, wipers 70 and 72, and normally closed contacts of the reversing relay 100 to the upper and lower windings of the line relay 101 of the repeater E.

When the line is extended to the repeater as above explained the line relay 101 is energized and closes a circuit of the slow acting release relay 102. Upon energizing, relay 102 completes a holding circuit extended back to the selector D and line switch C as follows: ground at $G^3$, armature 112 and its working contact, conductor 77, test contact 74, test wiper 71, and the armature 61 and its working contact to conductor 64, where it joins the previously described holding circuit extending back to the line switch C. The above described circuit serves to maintain relays 55 and 13 energized throughout the duration of the connection.

In addition to closing the holding circuit for the automatic switches C and D, the relay 102 of the repeater E prepares a circuit at its armature 115 for the slow acting relay 103, closes a circuit at its armature 114 which energizes the polarizing winding of the electro-polarized relay 105, and at its armature 113 completes a bridge across the trunk conductors 130 and 131 which may be traced over the following path: conductor 130, armature 113 and its working contact, armature 116 and its resting contact, upper winding of the electro-polarized relay 105, normally closed contact springs controlled by armature 107 of relay 100, right hand winding of the impedance coil 106, and armature 111 and its working contact to the conductor 131. By the closure of this bridge across the trunk line a circuit is completed for the double wound line relay 203 in the cord circuit O, and the said relay 203 is therefore operated. Upon energizing, relay 203 completes parallel energizing circuits for the slow acting relays 210 and 202. These relays are therefore energized at the same time and may be considered as one relay, but in view of the large number of contact springs it is advisable in practice to use two relays with the contact springs divided between them. Relay 201 prepares a circuit for the reversing relay 204 at its armature 219, at its armature 216 connects direct ground to the lower winding of the line relay 203, and at its armature 229 prepares a circuit for the call signal lamp $L^7$. Relay 202 at its armature 217 prepares an operating circuit for the register switches of whichever set is later selected, and at its armature 218 closes an operating circuit for the individual line switch C′ which extends as follows: ground at $G^4$, resting contact of armature 215 and the said armature, working contact of armature 218 and the said armature, conductor 242, armature 256 and its resting contact, common conductor 451, and armature 456 and its resting contact to battery. Upon the completion of the above circuit the line relay 251 is energized and at its armature 258 closes a circuit for the switching relay 250 in series with the stepping magnet 252. At the same time, at its armature 257, the line relay connects the test wiper 262 with the above mentioned circuit at a point midway between the switching relay and the said stepping magnet, whereupon a trunk selecting operation will take place similar to that which has already been described in the case of the individual line switch C. For the sake of simplicity it will be assumed that the wipers of the line switch C′ are already in connection with the bank contact set associated with the first register set, as shown in the drawing, and it will be assumed furthermore that this register set is idle. It will be evident therefore that test contact 266 will not be grounded, and no rotation of the line switch C′ will take place. The switching relay 250 is at once energized and establishes a locking circuit for itself at its armature 255. Relay 250 also performs a number of other circuit changes which may be mentioned briefly as follows: At armature 254 ground is connected to the test wiper 262 for the purpose of rendering the multiples of test contact 266 busy in the banks of the other rotary line swiches, at armatures 253 and 269 conductors 243 and 241 are extended through to wipers 260 and 263, respectively, and at armature 256 the conductor 242 is disconnected from the winding of the line relay 251 and is extended by way of the working contact of armature 256, wiper 261, bank contact 265, and the winding of relay 300 of the register switch $R^1$ to battery. Upon the closure of the circuit relay 300 is operated and at its armature 309 disconnects ground from the common conductor 450, at its armature 311 disconnects ground from a releasing circuit extending over conductor 330 which will be described later on, and at armature 310 closes an operating or control circuit for the register switch $R^1$ which will shortly be traced in full.

The apparatus is now ready for the reception of the series of impulses corresponding to the first digit in the local number of the called line in the manual exchange. It is understood, of course, that the first digit in the telephone number which operated the selector D at the automatic exchange has to do with the office selection only and does not appear in the multiple at the B operator's position. When the dial of the calling device S is operated in accordance with the next digit therefor another series of interruptions, three in this case, will be produced in the line circuit and will bring about a like series of deenergizations of the line relay 101 of the repeater E. At each deenergization relay 101 at its armature 110 sends an impulse of current to the slow acting relay 103 which is energized at the first impulse and maintains its armature attracted while the repeater is repeating a series of impulses. In its energized position relay 103 completes a bridge across trunk conductors 130 and 131 over a direct path which may be traced by way of armature 113 and its working contact, armature 116 and its working contact, and armature 111 and its working contact to conductor 131. At the same time that the line relay sends impulses to the slow acting relay 103, it also produces a series of interruptions in the bridge across the trunk conductors 130 and 131 by means of its armature 111. These interruptions cause the line relay 203 in the cord circuit O to be deenergized a plurality of times, and at each deenergization the said relay transmits an impulse of current to the stepping magnet 306 of the register switch $R^1$ over the following path: ground at $G^5$, armature 221 and its resting contact, working contact of armature 217 and the said armature, conductor 243, armature 253 and its working contact, wiper 260, bank contact 264, armature 310 and its working contact, normally closed contact springs controlled by armature 312, winding of the slow acting relay 302, and the winding of the stepping magnet 306 to battery. Since three interruptions are produced by the calling device S, which were repeated as above described, the stepping magnet 306 will receive three impulses of current and the wipers 307 and 308 will be rotated three steps and will come to rest in engagement with the third contacts in their respective banks. The operation of wiper 308 produces no result at this time, but wiper 307 when it moves out of normal position closes a circuit for the relay 301 which upon energizing changes the operating circuit so that it extends by way of the armature 310 and its working contact, working contact of armature 312 and the said armature, armature 315 and its working contact (slow acting relay 302 being now energized), winding of relay 302 and the winding of the stepping magnet 306 to battery. Relay 301 also prepares a circuit for the release magnet 305 at armature 313, and at armature 314 connects ground to test contact 266 and its multiples in the banks of the other individual line switches. The latter operation is for the purpose of maintaining these test contacts grounded during the releasing operation in the register set, as will be pointed out more fully hereafter. The slow acting relay 302, which is energized in series with stepping magnet 306 and which remains in operated position while operating impulses are being received, deenergizes after the operation of the register switch $R^1$ is completed and at its armature 315 extends the operating circuit to the next register switch $R^2$ as follows: armature 315 and its resting contact, conductor 329, contact springs controlled by armature 368, winding of the slow acting relay 361, and the winding of the stepping magnet 364 to battery.

The apparatus is now ready to receive the next series of impulses. When the calling device is operated again, this time in accordance with the digit 4, a series of four interruptions is produced in the circuit of the line relay 101 of the repeater E, which are repeated as before with the result that four impulses of current are transmitted to the stepping magnet 364 of register switch $R^2$. In response to these impulses the stepping magnet 364 is operated to rotate the wipers 365 and 366 four steps, and the wipers are brought to rest in engagement with the fourth contacts in their respective banks. When the wiper 365 leaves its normal position a circuit is completed for relay 360 which, upon energizing, prepares a circuit for the release magnet 363 at its armature 367 and at its armature 368 prepares the operating circuit for transfer to the next register switch by the slow acting relay 361. This latter relay is energized in series with the stepping magnet 364 while the said magnet is being operated and deenergizes at the end of the rotary movement as was described in the case of the slow acting relay 302 of register switch $R^1$. The slow acting relay 361 having deenergized, the operating circuit is extended to the register switch $R^3$ as follows: conductor 329, working contact of armature 368 and the said armature, armature 369 and its resting contact, conductor $329^a$, contact springs controlled by armature 387, winding of the slow acting relay 381, and the winding of the stepping magnet 384 to battery.

The next digit to be called is the last digit which is included in the line designation of the line of substation A′ which appears in the multiple at the B operator's position, the final digit being a party line digit having to do with the selective ringing, as before stated. The calling subscriber may now call the digit 5 with the result that five operating impulses are transmitted to the stepping magnet 384 of the register switch $R^3$. By the operation of the stepping magnet 384, wipers 397 and 398 are rotated step by step until they come to rest in engagement with the fourth contacts in their respective banks. When the wiper 397 leaves its normal position a circuit is completed for the relay 380 which, upon energizing, changes the operating circuit at its armature 387, the same as was done in the case of the two register switches previously operated, prepares a circuit for the release magnet 383 at its armature 386, and at its armature 385 prepares a circuit for the timing switch P. The slow acting relay 381 is energized in series with the stepping magnet 384, remaining in operated position while impulses are being received, and at the end of the operation of the register switch $R^3$ is deenergized, whereby the operating circuit is transferred to the register switch $R^4$ as follows: conductor $329^a$, working contact of armature 387 and the said armature, armature 388 and its resting contact, conductor $329^b$, contact springs controlled by armature 408, winding of the slow acting relay 401, and the stepping magnet 404 of the register switch $R^4$ to battery. Register switch $R^4$ is now ready for operation in response to the calling of the party line selecting digit.

When the slow acting relay 381 deenergizes at the end of the operation of the register switch $R^3$ it closes at its armature 389 a circuit for the stepping magnet 433 of the timing switch P as follows: grounded conductor 399, working contact of armature 385 and the said armature, armature 389 and its resting contact, armature 410 and its resting contact, armature 436 and its resting contact, and the winding of the stepping magnet 433 to the common conductor 435. Since the common conductor 435 is connected to battery at half second intervals by the time mechanism T, the stepping magnet 433 immediately begins operating to advance the wipers 437 and 438 step by step over their associated banks of contacts. As soon as wiper 437 leaves its normal position it completes a circuit for the relay 430 which upon energizing prepares a circuit for the release magnet 432.

The calling subscriber may now operate his calling device in accordance with the digit 1 which is the last digit to be called. By this operation a single impulse of current is transmitted through the stepping magnet 404 of the register switch $R^4$ over a circuit previously traced, and the said magnet is operated to advance the wipers 417 and 418 into engagement with the first contacts in their respective banks. When the wiper 417 leaves its normal position a circuit is completed for relay 402 which upon energizing prepares a circuit for release magnet 403 at its armature 406, changes the operating circuit in the usual manner at its armature 408, prepares a circuit at its armature 409 which is closed later by armature 407 of relay 401 and which will be described hereinafter, and at its armature 410 breaks the circuit of the stepping magnet 433 of the timing switch P. By the latter operation the movement of the timing switch is stopped, and it may be mentioned here that its operation in the present case, where the party line substation A′ is being called, is of no utility. The function of this switch will be pointed out later on. The slow acting relay 401 is energized in series with the stepping magnet 404 of the register switch $R^4$ and when it deenergizes at the end of the rotary movement of said switch a circuit is closed at its armature 407 which extends as follows: grounded conductor 419, working contact of armature 409 and the said armature, armature 407 and its resting contact, conductor 328, and the winding of the relay 303 to battery. A branch of the above circuit may also be traced by way of conductor 341 to the register set pilot lamp $L^1$ at the operator's position. When the above traced circuit is completed the pilot lamp $L^1$ is illuminated to indicate that the register set associated therewith has a connection set up on it, and the relay 303 is energized. Upon energizing, relay 303 connects the exchange battery by way of resistance 470 to the upper terminal of relay 304 at armature 317, and at its armature 316 connects the common conductor 340 to the circuit of relay 304 at a point between the winding of the relay and the said resistance 470. Assuming now that there is no other call switched through onto the indicating lamps relay 304 will be energized over the following circuit: ground at $G^7$, resting contact of armature 472 and the said armature, conductor 321, winding of relay 304, working contact of armature 317 and the said armature, and the resistance 470 to battery. Upon energizing, relay 304 connects ground to the common conductor 340 by means of armature 318, and at its armatures 319 and 320 disconnects ground $G^7$ from the loop circuit extending by way of conductor 322 to the No. 2 register set. Two armatures are used in order to reduce the possibility of trouble from a dirty connection in this circuit.

Relay 304 is the relay which switches over the registered call to the indicating lamps, and the manner in which this is done will now be explained, it being recollected that the wipers of register sets $R^1$—$R^4$, inclusive, are now resting upon the third, fourth, fifth and first contacts in their respective banks. When the armature 319 of relay 304 is attracted ground $G^7$ is connected by way of conductor 348, the common conducting strip in the bank of register switch $R^1$ with which this conductor is connected, and the wiper 308 to the conductor 353, which it is understood extends to the lamp #3 in the first group of the indicating device V. When armature 320 of relay 304 is attracted ground $G^7$ is connected to the conductor 327 thereby causing relays 362, 382, and 400 of the other three register switches to be energized. Each of these relays has the function of grounding a common strip in the bank of its associated switch, as shown in the drawing, and it will be clear therefore that when these relays are energized, the wipers being operated as previously stated, conductors 374, 395, and 411 will be grounded. These last three conductors extend to the #4 lamp of the second group, the #5 lamp of the third group, and the B lamp (black) of the fourth group. The other side of all the lamps is connected to battery as shown in the drawing, and the lamps mentioned are accordingly illuminated and indicate to the operator the number 345 black.

When the relay 382 of the register switch $R^3$ is energized it closes the following circuit for the trunk or call signal lamp $L^7$ in the cord circuit O over the following path: ground at $G^8$, armature 396 and its working contact, conductor 331, bank contact 267, wiper 263, working contact of armature 269 and the said armature, conductor 241, resting contact of armature 212 and the said armature, working contact of armature 229 and the said armature, and the lamp $L^7$ to battery. The lamp $L^7$, which is individual to the cord circuit O, is therefore lighted simultaneously with the lamps in the indicating device V and enables the operator to know which one of her cord circuits is being used by the automatic subscriber whose wanted number is at this particular time being shown on the indicating device. Having observed the number 345 black, and knowing by the lighting of the lamp $L^7$ that the cord circuit O is the one in use, the operator will test the multiple jack of line 345 with the tip of the plug in the usual manner to ascertain whether or not the line is busy.

In case the line is busy the plug will be inserted in a busy jack of well known form and function, in order to give the calling subscriber a busy signal. The busy machine associated with the busy jacks at the B board is preferably of the same type and giving the same kind of a busy signal as the busy machine in the automatic exchange, so that the calling subscribers will get uniform busy signals in all cases. Assuming however, that the line of substation A′ is found to be idle, then the operator will press the black ringing button, indicated by reference character B in the drawing, and will insert the plug of cord circuit O in the multiple jack #345, this being the jack J in which is terminated the line of substation A′. It may be mentioned at this time that each cord circuit is provided with the usual black, white, green and red selective ringing buttons as shown, which correspond to the 16, 33, 50, and 66 cycle ringing current frequencies, respectively. The ringing keys are of the self locking type and when any key is depressed it remains locked in depressed position until another key is operated. When the plug is inserted in the jack J a circuit is completed for the relay 208 in the cord circuit O as follows: ground at $G^9$, winding of the cut off relay 230, sleeve of the jack J, sleeve of the plug, and winding of relay 208 to the junction point 231, where the circuit divides, one branch extending by way of the supervisory lamp $L^8$ to battery, and the other branch extending by way of armature 220 and its working contact, working contact of armature 228 and the said armature (closed as soon as relay 208 energizes), armature 225 and its resting contact, contact springs controlled by armature 226, and the winding of relay 205 to battery. By current flow over the above circuit, relays 230 and 208 are energized in series, the former relay being effective to clear the line of substation A′ of its normal battery and ground connections, and the relay 208 being effective to disconnect the operator's telephone set and close the upper talking strand of the cord circuit at armature 227. The lamp $L^8$ is lighted when the circuit is first closed by the insertion of the plug, but as soon as the branch circuit through relay 205 is closed by the energization of relay 208 the lamp is extinguished by the shunting of the current through this relay, which is of relatively low resistance. Relay 205 is the ringing relay, and is energized at this time to close at its armatures 223 and 224 the usual automatic ringing or signaling circuit which, since the black ringing key has been depressed, will include the 16 cycle generator. The ringer at substation A′ is tuned to the 16 cycle frequency and response to signal the called subscriber.

The required connection has now been established and the desired party is being signalled automatically in the usual way. Before proceeding with the operations which take place when the called subscriber answers it will be well to consider the release of the register switches which takes place as soon as the connection is established by the insertion of the plug in the jack of the called line. When the plug of cord circuit O is inserted in jack J a branch path may be traced from the sleeve of the plug by way of conductor 232 and the winding of relay 200 to battery. Relay 200 is therefore energized in parallel with relay 208 when the plug is inserted in the jack and upon attracting its armature 212 extinguishes the call signal lamp $L^7$. Relay 200 also opens at its armature 213 the inductive path which extends from trunk conductor 130 by way of the condenser to conductor 243, shifts its armature 214 from ground to battery for a purpose which will be explained hereinafter, and at its armature 215 opens the holding circuits of relays 250 and 300 of the individual line switch C′ and the register switch $R^1$, respectively. Upon deenergizing, relay 250 disconnects the wipers of the line switch C′ and the switch is thus restored to normal condition. When relay 300 deenergizes ground $G^{10}$ is connected to conductor 330 with the result that the previously prepared circuits for the release magnets 305, 363, 383, 403 and 432 of register switches $R^1$, $R^2$, $R^3$, $R^4$, and timing switch P, respectively, are completed and the said switches are restored to normal position. When the switches reach normal position relays 301, 360, 380, 402, and 430 are deenergized and the release magnet circuits of the several switches are broken. Relay 301 also disconnects ground from the test contact 266 and its multiples thereby rendering the No. 1 register set accessible to other calls. When the register switches are released as above explained, relays 303 and 304 are deenergized, but the effect of the deenergization of these relays upon other register sets which may be in use at the time will be deferred until later.

Returning now to the established connection, while the called subscriber is being signalled automatically as before explained, the calling subscriber in the automatic exchange is given the well known "ringing current induction" by means of the circuit through the high resistance 233 which bridges the open contact in the upper strand of the cord circuit at armature 223 of the ringing relay 205. This resistance permits sufficient ringing current to leak back in the direction of the calling subscriber to give an audible signal each time ringing current is applied to the called line, and he is thereby advised that the ringing operation is proceeding. This so called "ringing current induction" is standard practice in automatic systems and by providing for the same thing in the B operator's cord circuits we provide for uniform operating conditions. To proceed, the ring cut off relay 206 is included in the ringing circuit, but does not energize as long as the receiver at substation A′ remains on the hook. When the called subscriber at substation A′ removes his receiver responsive to the ringing of his bell the relay 206 is energized by the increased current flow and opens the back contact of its armature 225, thereby including relay 207 in the circuit of the relay 205. Relay 207 therefore is at once energized and upon attracting its armature 226 short circuits relay 205 and locks itself in the circuit over the sleeve of the cord. In other words, relay 207 is substituted for relay 205, and it may be mentioned that relay 207 is of the same resistance as relay 205 and the supervisory lamp $L^s$ therefore remains shunted out. When relay 205 deenergizes the ringing circuit is broken and the upper and lower talking strands of the cord circuit are connected, whereupon the talking circuit will have been completely established. The calling subscriber is supplied with talking battery through the windings of line relay 101 at the repeater E, and the called subscriber is supplied with talking battery through the right hand windings of the repeating coil at the cord circuit O. Relay 209 is included in the latter circuit and is operated by current flow through the transmitter at substation A′ to attract its armature 222 and close the circuit of the reversing relay 204. By the operation of the reversing relay 204 the trunk conductors 130 and 131 are reversed as regards their connections with the windings of the line relay 203 and the direction of current flow over the conductors of the trunk line is therefore reversed. The direction of current flow through the upper winding of the electro-polarized relay 105 at the repeater E is therefore reversed and this relay is now operated. At armatures 118 and 120 relay 105 closes the bridge over a path which is independent of the contacts controlled by relays 103 and 101 so that the elements normally in the bridge cannot be cut out or the bridge opened by accidental operation of the dial at substation A. In addition, at armature 119, relay 105 closes a circuit for the reversing relay 100 in the repeater, which operates in the same way as was described in the case of the reversing relay 204 to reverse the direction of current flow in the line of substation A. This operation may be used for operating a meter or supervisory apparatus and is provided for according to standard practice, although it is of no utility in the particular circuit shown. By operating its armature 107, relay 100 introduces the left hand winding of the impedance coil 106 in the bridge across trunk conductors 130 and 131 in series with the right hand winding of this coil, thereby increasing the impedance of the bridge and increasing the efficiency of the talking circuit.

The required connection having been established, the subscribers may now converse as desired. When the conversation is finished both subscribers will hang up their receivers. When the receiver is replaced at substation A the circuit of the line relay 101 of the repeater E is broken and relays 101 and 102 are therefore deenergized. The latter relay breaks the holding circuit extending back to the line switch C and the selector D by retracting its armature 112, and as a result relays 13 and 55 are deenergized. Relay 13 in the line switch C disconnects the wipers of the line switch which is thereby restored to normal condition ready for use in another call. Relay 55 closes the circuit of the release magnet 57 at its lower armature and the operation of the said magnet restores the selector D to normal position in the usual manner, the circuit of the release magnet being broken by the off normal springs when the switch is completely restored. When the relay 102 of the repeater deenergizes it also opens at its armature 113 the bridge across the trunk conductors 130 and 131, and thereby causes the line relay 203 at the cord ciruit O to deenergize, resulting in the denergization of slow acting relays 201 and 202 also. Relay 202 by retracting its armature 220 opens the shunt path around the supervisory lamp $L^s$ which extends through the relay 207 to battery, and thereby causes the lamp $L^s$ to be lighted to give the operator a disconnect signal. Relay 201, upon deenergizing, permits the contact springs controlled by its armature 216 to close thereby connecting the lower winding of the line relay 203 by way of resistance 234 to battery instead of ground to which it was formerly connected. By this operation a circuit is established for relay 104 at the repeater which extends as follows: grounded armature 110 of line relay 101, resting contact of the said armature, armature 115 and its resting contact, winding of relay 104, conductor 131, lower left hand winding of the repeating coil, contact springs controlled by the lower armature of reversing relay 204 (this relay being now deenergized), lower winding of the line relay 203, normally closed contact springs controlled by armature 216, armature 214 and its working contact, and the resistance 234 to battery. The relay 104 at the repeater E is energized by current flow over the above circuit and upon attracting its armature 117 again connects ground to the conductor 77. By this operation the test contact 74 and its multiples in the banks of the other office selectors are again grounded and the trunk line is made busy.

The automatic switches have now been released, a disconnect signal has been given to the operator, and the trunk line in use has been made busy pending the pulling down of the connection at the B board. When the operator observes the lighted supervisory lamp $L^s$ she will remove the plug of cord circuit O from the jack and relays 230 and 208 will be deenergized, and the lamp $L^8$ will be extinguished. Also the relay 200 will be deenergized and ground will again be connected to the lower winding of the line relay 203, as is the normal condition. Relay 104 at the repeater E is therefore deenergized and ground is disconnected from conductor 77, with the result that the trunk line is restored to idle condition. The apparatus has now all been completely returned to normal in readiness for use in other connections.

Having described the operation of the set as a whole, we will now explain certain details which it was not convenient to go into fully before; and the first thing which will be considered is the function of the timing switch P, Fig. 4. The necessity of providing one of these switches for each register set is occasioned by the fact that the system herein contemplated includes both party lines and straight lines, the party lines having one more digit in their telephone numbers than do the private or straight lines. It is understood that means must be provided in each register set for switching over onto the indicating lamps as soon as the registering of a telephone number is completed. The registering of a telephone number is completed when the final digit is called, and in the case of party line numbers which have a maximum number of digits, the problem is a simple one, it being only necessary to provide means in the last register switch, register switch $R^4$ for example, for closing the circuit of the relay which places the register set in condition to be switched over. This relay is the relay 303 in register set No. 1, and it has already been explained fully how the circuit of this relay is closed as soon as the register switch $R^4$ has finished operating. But when a private line is being called the proposition is not so simple. The telephone number of a line of this kind will have one less digit than do the party line telephone numbers and when the number is registered therefor the register switch $R^4$ will never be operated. It will not do ordinarily to have the register switch $R^3$ close the circuit of relay 303 directly because in case a party line number is called instead of a private line number this relay would be operated prematurely. In order to take care of this difficulty we provide the timing switch P, which is started operating as soon as the register switch $R^3$ has finished its operation, as previously explained, and which after a certain definite time interval closes the circuit of the relay 303. This time interval is calculated in accordance with the average length of time required to call the final digit in a telephone number, and may be of about four seconds duration, or less. To explain the operation a little more fully let it be assumed that some telephone number is being registered and that the register switch $R^3$ has just completed its operation. The timing switch P will now be set in motion by the closure of the circuit of its stepping magnet 433, in a manner which was already described, and will advance its wipers step by step over their associated bank contacts. If the number being called is a party line number the calling subscriber will immediately call the final digit in the telephone number, which is registered on the registry switch $R^4$; and the operation of the timing switch P will be stopped as soon as relay 402 energizes the circuit of stepping magnet 433 being opened at armature 410. Suppose now that a private line number is being registered, in which case the digit which operates register switch $R^3$ will be the final digit. The timing switch continues its operation in such case without interference and after an interval of four seconds the wiper 438 will place a ground on conductor 439. The circuit of relay 431 is thereby closed, which relay operates to open the circuit of the stepping magnet 433 at its armature 436. At the same time a circuit is completed for relay 303 as follows: grounded conductor 439, resting contact of armature 442 and the said armature, resting contact of armature 409 and the said armature, armature 407 and its resting contact, conductor 328, and the winding of relay 303 to battery. By the closure of the above circuit relay 303 is energized, and in case the indicating lamps are not in use relay 304 will be energized also to switch the call over onto the lamps. The operations from now on are the same as have been previously described.

An alternative method of switching on which may be employed at the option of the B operator during day time busy periods will now be briefly explained. At such times the number of calls for party line stations is at a minimum because as a general rule all the business houses will have individual private lines; and it is found that the service may be speeded up greatly without causing any particular trouble by cutting out the timing switches, which it is understood are provided solely for the benefit of those parties who are calling party line numbers. In order to accomplish this the B operator will operate key $K^7$ which places a ground potential upon conductor 332 and operates the relay 441. There is a similar relay operated over the same conductor for each of the other register sets at the position. Relay 441 being in operated position, let it be assumed that a call is received and is registered on the No. 1 register set. As soon as the register switch $R^3$ finishes its operation a circuit for relay 303 is completed as follows: grounded conductor 399, working contact of armature 385 and the said armature, armature 389 and its resting contact, armature 410 and its resting contact, working contact of armature 442 and the said armature, resting contact of armature 409 and the said armature, armature 407 and its resting contact, conductor 328, and the winding of relay 303 to battery. Relay 303 is therefore energized as soon as the register switch $R^3$ completes its operation, and the call may be switched over immediately without waiting for another digit to be called, or for the time mechanism to operate. Should it happen that a party line number is being called, no particular harm is done by the switching over onto the indicator lamps, should this have taken place. The calling subscriber will generally start to call the final digit before the operator has had time to insert the plug into the supposed number of the called line, or perhaps even before she has fixed the number in her mind, and as soon as the register switch $R^4$ starts operating the circuit of relay 303 will be broken (at armature 407 of relay 401) and the lamps will be extinguished. If another call is waiting it will be switched onto the lamps at once, while if no call is waiting the call under consideration will be again switched onto the lamps as soon as the register switch $R^4$ has been operated. Since the lamps ordinarily are extinguished only when the plug is inserted in the jack of the called line, if the lamps go out automatically before she has plugged in, the operator will know that another digit is being called and that she will have to wait for the complete number to be flashed on before she can handle the connection.

We will now describe briefly the consecution control circuit connected between the register sets at the same position which controls the switching or registered calls over onto the indicator lamps one at a time. We will suppose that a call has been received and registered on the No. 1 register set, and that simultaneously, or at least before the operator has completed the connection called for by the number registered on the No. 1 set, calls are received on register sets 2, 3, and 4, the relays in such sets which correspond to relay 303 of the No. 1 set being energized and the corresponding pilot lamps being lighted in front of the operator. Since all the relays such as relay 303′, etc., are energized, each of the relays such as relay 304′ will have its upper terminal connected through a resistance to the exchange battery, but none of these relays will be energized at this time because the circuit extending to ground is opened at armatures 319 and 320 of the relay 304 of the No. 1 register set. The calls received on register sets Nos. 2, 3, and 4, are not switched over at once therefore, but are held up while the operator is establishing the connection registered on the register set No. 1. When this connection is established by the insertion of the plug in the jack of the called station, the No. 1 set is restored to normal and relays 303 and 304 are deenergized. As a result, ground is removed from the common conductor 340 and an instant later conductor 321 is connected with conductor 322. As soon as the latter operation takes place ground $G^7$ is again extended over a series circuit to all the relays such as relay 304′ in the three register sets in use, and these relays will start to operate simultaneously. Relay 304′, however, is the only relay which completely operates, for this relay disconnects conductor 322 from conductor 323 which extends to the corresponding relay of the next register set, it being understood that the series circuit continues through all the register sets in the same way as is shown in the case of register sets Nos. 1 and 2. Upon energizing, relay 304′ grounds the common conductor 340, and also grounds conductors 348′ and 327′, by which latter operations the registered call is switched over onto the lamps. Suppose now that the register set No. 1 is again taken for use before the operator has completed the connection corresponding to the number registered on the No. 2 register set. As soon as the last register switch of the No. 1 set is operated relay 303 will energize, but now since the No. 2 register set is operatively connected with the indicator lamps the relay 304 of register set No. 1 will not energize to switch on the registered call. This result is obtained notwithstanding the fact that now the circuit of relay 304 to ground $G^7$ is uninterrupted, for since the common conductor 340 is grounded relay 304 will be short circuited and will not be energized. As soon as the connection corresponding to the number registered on the No. 2 set has been completed by the operator, the No. 2 register set is released, relays 303′ and 304′ are deenergized, and among other operations which take place ground is removed from the common conductor 340. As soon as this conductor is freed from ground, relay 304 of the No. 1 register set will operate with the results aready described and understood.

It will be seen from the foregoing that by means of two circuits, towit, the circuit of the common conductor 340 and the series circuit including conductors 321, 322, 323, etc., provision is made for switching registered calls over onto the indicator lamps one at a time. It will be seen that calls received on the No. 1 register set will have the preference over calls received on the other register sets because relay 304 precedes relay 304′ and other similar relays in the series circuit. For the same reason calls received on the No. 2 register set will have the preference over calls received on register sets Nos. 3, 4, 5, and 6. This is illustrated in the operations described in the preceding paragraph in which calls were left standing on the third and fourth register sets while a subsequent call received on the No. 1 register set was switched over ahead of them. This discrimination in favor of the lower numbered register sets is perhaps objectionable, but ordinarily does not cause any trouble because the operator is generally able to complete connections as fast as they are received. It may be stated that in this system the connections can be set up with great rapidity, the operator being able to work with both hands and plug up connections as fast as she can read the numbers which are flashed out by the indicating lamps. It may happen, however, that during extremely busy periods a call may be tied up on some register set for an unduly long period. To permit the operator to handle such calls at once we provide a special cut in key for each register set except the No. 1 register set. These keys are indicated by reference characters $K^2$–$K^6$, inclusive, and are located just below the associated pilot lamps. If the operator observes that a call on register set No. 3, for example, has been held up for sometime by a continuous succession of calls on register sets Nos. 1 and 2, she will actuate key $K^3$. By this operation the relay 471 is energized and ground $G^7$ is disconnected from the series circuit. At the same time, ground is connected to conductor 323 direct by means of the key and as soon as the connection being handled is completed the call on register set No. 3 will be switched over to the exclusion of calls which may be waiting on register sets Nos. 1 and 2 which ordinarily would precede the call on register set No. 3.

There is one other condition which may be discussed before concluding. This is the case where a call is received at the operator's position when all the register sets are busy. The common conductor 450 is normally grounded at each of the register sets, the ground connection being shown in the case of the No. 1 register set at the resting contact of armature 309 of relay 300, and at the corresponding armature in the case of the No. 2 register set. If all register sets are busy it will be evident that all of these ground connections in the different register sets will be opened and the common conductor 450 will be clear of ground. The normally short circuited relay 453 is thereupon energized and closes a circuit for relay 455. Upon energizing, relay 455 lights the lamps $L^9$ to indicate the condition of all register sets busy, and at the same time switches the conductor 451 from battery into connection with the winding of relay 454. Conductor 451 is a common conductor which supplies battery to the line relays, such as line relay 251, of all the rotary line switches such as the rotary line switch C′, which are associated with this particular operator's position. Suppose now that a call is received over the trunk line terminating in the cord circuit O. When relay 202 at the cord circuit is energized and closes the circuit of line relay 251, the said line relay is not now operated, due to the fact that the circuit now includes the winding of the high resistance relay 454. Relay 454 is energized, however, and connects the busy signalling machine Q with the common conductor 452 which extends to all the rotary line switches as shown in the case of the line switch C′. The circuit from the busy signalling machine may now be traced by way of the common conductor 452, resting contact of armature 253 and the said armature, conductor 243, armature 217 and its working contact, armature 213 and its resting contact, and the condenser to the trunk conductor 130. It follows that the calling subscriber will be given a busy signal, which indicates to him that for the time being the desired connection cannot be obtained and he will replace his receiver.

Having described our invention, what we consider to be new and desire to have protected by Letters Patent will be pointed out in the appended claims.

What we claim as our invention is:

1. In a telephone system, a plurality of register sets accessible to calling automatic stations for registering called telephone numbers, a common set of indicating lamps for indicating numbers so registered to an operator, means for causing numbers registered at the same time to be indicated by said lamps successively in a definite order of preference, and operator controlled means whereby a call registered on any register set may be given preference over all other calls.

2. In a telephone system, a plurality of register sets accessible to calling automatic stations for registering called telephone numbers, a common set of indicating lamps for indicating numbers so registered to an operator, means for causing numbers registered at the same time to be indicated by said lamps successively, in a definite order, and a key individual to each register set for causing a call registered thereon to be indicated by said lamps out of its regular turn.

3. In a telephone system, a plurality of register sets accessible to calling automatic stations for registering called telephone numbers, a common set of indicating lamps for indicating numbers so registered to an operator, means for causing numbers registered at the same time to be indicated by said lamps successively in a definite order of preference, and a key individual to each register set for placing such set first in order.

4. In a telephone system, a plurality of lines the numbers of which include a variable number of digits, a register set comprising sufficient registers to register the number of a called one of said lines containing the maximum number of digits, a device for indicating any registered number to an operator, a timing mechanism set in motion when a number is registered which contains less than the maximum number of digits, and means controlled by said time mechanism for causing such number to be indicated after a definite time interval.

5. In a telephone system, a plurality of lines having numbers containing a variable number of digits, a set of serially related register switches for registering the digits in the numbers of said lines when called, a bank of indicating lamps, switching means for causing registered numbers to be indicated by said lamps to an operator, a relay in the final register switch for controlling said switching means, and means for controlling said switching means independent of said relay.

6. In a telephone system, a plurality of lines having numbers containing a variable number of digits, a set of serially related register switches for registering the digits in the numbers of said lines when called, a bank of indicating lamps, switching means for causing registered numbers to be indicated by said lamps to an operator, and a plurality of devices for operating said switching means, the device used in any case depending on the number of digits in the called number.

7. In a telephone system, a plurality of lines having numbers containing a variable number of digits, a set of serially related register switches for registering the digits in the numbers of said lines when called, a bank of indicating lamps, switching means for causing registered numbers to be indicated by said lamps to an operator, a time mechanism for operating said switching means after a definite time interval, and means for setting said mechanism in motion upon the operation of an intermediate register switch.

8. In a telephone system, a plurality of lines having telephone numbers containing a variable number of digits, a register set for registering the numbers of said lines when called, said set comprising sufficient register switches to register numbers having the maximum number of digits, a device for indicating any registered number to an operator, a timing mechanism set in motion while a number is being registered, and means controlled either by said time mechanism or by the last register switch for causing the registered number to be indicated on said device.

9. In a telephone system, a plurality of lines having telephone numbers containing a variable number of digits, a register set for registering the numbers of said lines when called, said set comprising sufficient register switches to register numbers having the maximum number of digits, a device for indicating any registered number to an operator, a timing mechanism for causing registered numbers to be indicated on said device after a definite time interval, means for setting said mechanism in motion upon the operation of an intermediate register switch, means for stopping the operation of said mechanism when the final register switch is operated in case the called number contains the maximum number of digits, and means for causing the registered number to be indicated on said device after the last register switch has finished operating.

10. In a telephone system, private lines and party lines terminating in a manual exchange, the stations on said lines being numbered in accordance with a system in which the number of each party line station contains an extra digit, trunk lines extending to said exchange and accessible to automatic subscribers for calling said private and party lines, a register set for registering the digits in the numbers of lines so called, said set comprising as many registers as there are digits in a party line number, an indicating device for indicating numbers so registered to an operator, a timing mechanism set in motion when the final digit in a private line number is registered, and switching means for causing registered numbers to be indicated on said device, said switching means being operable by said time mechanism after a definite time interval and being also operable by the final register switch in case such switch is operated before the time interval has expired.

11. In a telephone system, a manual exchange, trunk lines terminating in cord circuits in said exchange, manual subscribers' lines accessible to said cord circuits, automatic subscribers' stations having access to said trunk lines for calling the said manual lines, a plurality of register sets for registering the telephone numbers of manual lines so called, an automatic switch for each of said cord circuits for connecting its associated cord circuit with an idle register set when the cord circuit is taken for use, and means for giving the calling automatic subscriber a busy signal in case all of said register sets are busy.

12. In a telephone system, a plurality of lines having numbers containing a variable number of digits, a set of serially related register switches for registering the digits in the numbers of said lines when called, a bank of indicating lamps, switching means for causing registered numbers to be indicated by said lamps to an operator, and a relay in the final register switch for initiating the operation of said switching means.

13. In a telephone system, a manual exchange, trunk lines terminating in said exchange, cord circuits for connecting said trunk lines with manual lines, automatic subscribers' stations having access to said trunk lines for calling the said manual lines, a plurality of register sets in the manual exchange for registering the telephone numbers of manual lines so called, automatic switching mechanism for connecting a trunk line with an idle register set when the trunk line is taken for use, and means for giving the calling subscriber a busy signal in case all said register sets are busy.

14. In a telephone system, means operable by numerical current impulses from a calling station to visually indicate to an operator the number wanted, an operator-controlled terminal adapted to be applied to the called line to complete connection from said calling station, other means including a numerical switch responsive to current from a station to automatically select said first means, and means controlled by the calling subscriber for releasing said first means to permit the same to restore to normal.

15. In a telephone system, means operable by numerical current impulses from a calling station to visually indicate to an operator the number wanted, an operator-controlled terminal adapted to be applied to the called line to complete connection from said calling station, a numerical selecting switch operating responsive to numerical impulses from said calling station to connect with said means, and means controlled by the calling subscriber for releasing said first means to permit the same to restore to normal.

16. In a telephone system, including a connecting circuit, means associated with said connecting circuit operable by numerical current impulses from a calling station to visually indicate to an operator the number wanted, an operator-controlled terminal for said connecting circuit adapted to be applied to the called line to complete connection from said calling station, mechanism adapted to operate responsive to numerical impulses to select a group including a plurality of said means, other mechanism adapted to select an idle means from the selected group, and means controlled by the calling subscriber for releasing said first means to permit the same to restore to normal.

17. In a telephone system, a device directively operated by current impulses sent over the calling subscriber's line to visually set up the number wanted, a plurality of groups of operator-controlled link circuits, a plurality of groups of said devices, the link circuits of a group and the devices thereof adapted to be operatively connected and disconnected, automatic selecting mechanism whereby a calling line may seize an idle circuit and device, and automatic means controlled by the calling subscriber for automatically releasing said device to permit said device to restore to normal.

18. In a telephone system, a device directively operated by current impulses sent over the calling subscriber's line to visually set up the number wanted, a plurality of groups of operator-controlled link circuits, a plurality of groups of said devices, the link circuits of a group and the devices thereof adapted to be operatively connected and disconnected, electromagnetic apparatus to connect and disconnect said circuits and said devices, and means controlled over the calling subscriber's line for releasing said devices to permit the same to restore to zero.

19. In a telephone system, a device directively operated by current impulses to visually set up the number wanted, a plurality of groups of operator-controlled link circuits, a plurality of groups of said devices, the link circuits of a group and the devices thereof adapted to be operatively connected and disconnected, automatic selecting mechanism including a non-numerical line switch and a numerical selector switch whereby a calling line may seize an idle circuit and device, electromagnetic apparatus to connect and disconnect said circuit and said device, and means controlled over the calling subscriber's line for releasing said device to permit the same to restore to zero.

20. In a telephone system, a device directively operated by current impulses sent over the calling subscriber's line to visually set up the number wanted, a plurality of groups of operator-controlled link circuits, a plurality of groups of said devices, the link circuits of a group and the devices thereof adapted to be operatively connected and disconnected, electromagnetic apparatus to connect and disconnect said circuits and devices, and means controlled from the calling line to restore the set up device to zero.

21. In a telephone system, a plurality of single-level selectors adapted for successive operation by numerical current impulses sent over the calling subscriber's line to respectively set up the digits of the called number before an operator, a single impulse circuit for said selectors, and means for switching it from one selector to the next, said means comprising off-normal contact springs and a slow release relay.

22. A telephone system including a plurality of advancing switches successively operated by current impulses sent over the calling subscriber's line to set up before an operator successive digit numbers of the called line, a single impulse circuit for said selectors, and means for switching it to successive selectors, including off-normal contacts for the first selector of the series to establish a new path for current impulses after the first impulse, and a slow release relay serving to close a locking contact in its circuit whereby said path is extended.

23. In a telephone system, a manual exchange, trunk lines terminating in cord circuits in said exchange, automatic substations having access to said trunk lines for calling the subscribers in the manual exchange, a plurality of register sets for registering the telephone numbers of called manual stations, an automatic progressively movable switch individual to each of said cord circuits, and means responsive to one of said cord circuits being taken into use for operating the associated switch to select an idle register set.

24. In a telephone system, a manual exchange and an automatic exchange, interoffice trunk lines terminating in plug ending cord circuits in the manual exchange, office selectors in the automatic exchange having access to said trunk lines and operable by calling subscribers responsive to the first digits in called numbers, a plurality of sets of register switches associated with said cord circuits for registering the remaining digits in called numbers, an automatic switch individual to each of said cord circuits operated responsive to a connection being extended to its associated cord circuit to automatically hunt for and connect an idle register set with such cord circuit, an indicating device comprising a plurality of lamps, and means for operatively connecting operated register sets with said indicating device one at a time.

25. In a telephone system, an automatic subscriber's line, an automatic exchange having switches therein, a manual exchange, a trunk line leading from the automatic exchange and terminating in a cord circuit at the manual exchange, an impulse repeater in said trunk line, a plurality of register sets, an automatic switch individual to said cord circuit for associating an idle register set therewith, means controlled by the subscriber for transmitting impulses first to operate the automatic switches in the automatic exchange to extend said line over said trunk to the cord circuit at the manual exchange and subsequently to operate said repeater to in turn control the register set associated with the cord circuit in use in the manual exchange, means controlled by said repeater for maintaining said operated switches in the automatic exchange in operated position and for making said repeater and cord circuit busy to all automatic switches having access thereto, a manual subscriber's line accessible to said cord circuit, means controlled by one of the subscribers for removing said busy condition to permit the automatic switches in the automatic exchange to release, and means in said repeater for rendering said cord circuit busy to automatic switches during the time said cord circuit remains connected with said manual line.

Signed by me at Chicago, Illinois, this 25th day of November, 1925.

TALBOT G. MARTIN.

Signed by me at Chicago, Illinois, this 25th day of November, 1925.

BERNARD D. WILLIS.